C. DOMSCHKE.
Corn and Cotton Planters.
No. 152,282. Patented June 23, 1874.
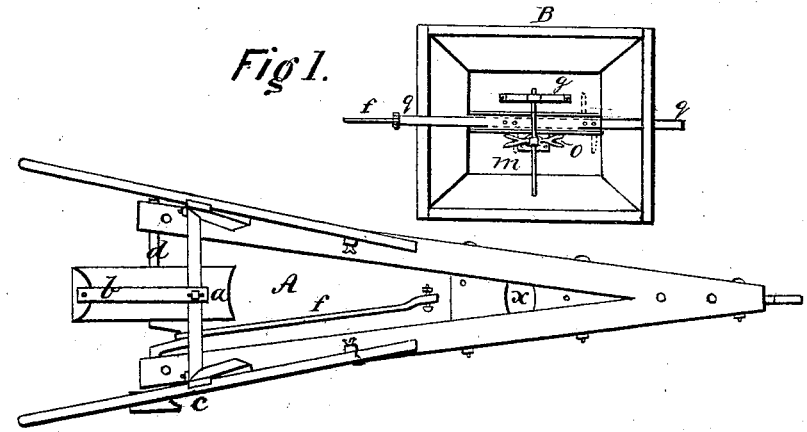
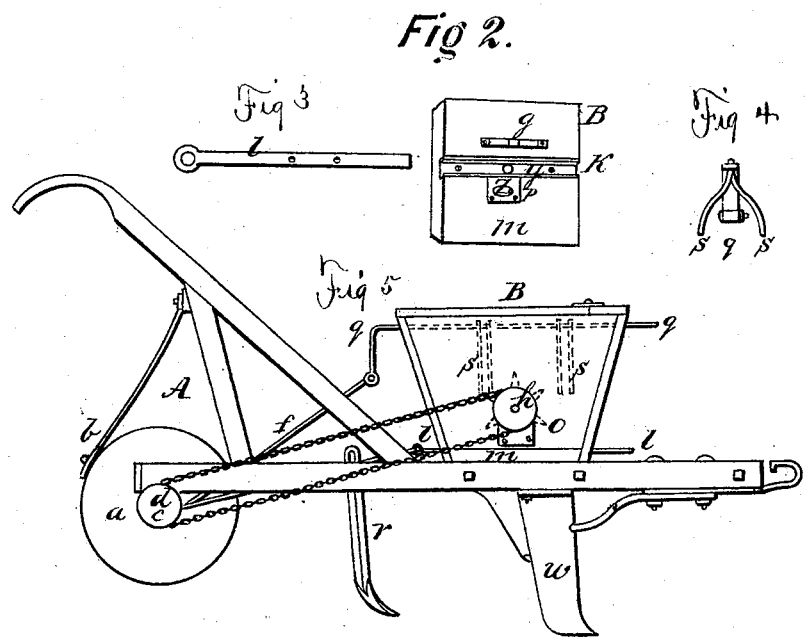
Witnesses
A. Gomert
Wm. Bauman
Inventor.
Carles Domschke

UNITED STATES PATENT OFFICE.

CARLES DOMSCHKE, OF AUSTIN, TEXAS.

IMPROVEMENT IN CORN AND COTTON PLANTERS.

Specification forming part of Letters Patent No. 152,282, dated June 23, 1874; application filed January 3, 1874.

*To all whom it may concern:*

Be it known that I, CARLES DOMSCHKE, of Austin, in the county of Travis and State of Texas, have invented a new and Improved Combined Corn and Cotton Planter, of which the following is a specification:

In the accompanying drawing, Figure 1 represents a top view of my combined corn and cotton planter, showing the seed-hopper detached from the frame. Fig. 2 is a detail top view of the laterally-movable bottom of the hopper; Fig. 3, a detail top view of the corn-slide. Fig. 4 is a detail end view of the reciprocating cotton-seed stirrer; and Fig. 5, a side view of the machine.

Similar letters of reference indicate corresponding parts in all the figures.

This invention relates to a new arrangement of bottom and seed slides in the hopper of a combined corn and cotton planter; and has for its object to permit the ready transformation of the corn-planter into a cotton-planter, and vice versa. The invention consists in the combination of a laterally-adjustable hopper-bottom, which has two seed-apertures, one for the discharge of corn, the other for the discharge of cotton, and which is grooved lengthwise for the reception of the reciprocating corn-slide, with said corn-slide, and with devices for agitating the cotton-seed, all as hereinafter more fully described.

In the accompanying drawing, the letter A represents the frame of the planter, and B the hopper, which is mounted upon the forward portion of the frame. The rear part of the frame A is supported by a wheel, $a$, which runs on the soil, and which is mounted upon a crank-shaft, $d$, that is hung transversely in the frame, as shown in Figs. 1 and 5 of the drawing. A scraper, $b$, extends from the frame into contact with the periphery of the wheel $a$, for the purpose of keeping the same clean during operation. The bottom $m$ of the hopper B is fitted loosely into place, so that it can be adjusted laterally. Through this bottom $m$ are formed two apertures, the larger of which, $z$, is for the discharge of the cotton-seed, while the smaller, $y$, is for the discharge of the corn.

When the machine is to be used for planting corn, the bottom $m$ is moved so as to bring its aperture $y$ over the discharge-opening $x$ of the frame, (shown in Fig. 1;) the other aperture $z$ is then closed. When, however, the machine is to be used for planting cotton, the bottom $m$ is slid sidewise to bring its aperture $z$ in line with $x$, and close $y$. A groove, $k$, is formed lengthwise in the bottom $m$, directly in line with the opening $y$, as shown in Fig. 2. $l$ is the corn-slide, being a perforated bar, which is introduced through openings in the ends of the hopper, to rest in the groove $k$ of the bottom $n$. The rear end of the slide $l$ is joined to a connecting-rod, $f$, which extends to the crank of the shaft $d$, as shown in the lower position of the rod $f$ in Fig. 5.

The machine as last described is now ready for planting corn. The slide $l$ is, during the rotation of the wheel $a$, reciprocated, and discharges seed at certain intervals through its apertures and through the apertures $y$ and $x$, into the tubular seed-discharge $w$, which also constitutes a furrow-opener, as indicated. $r$ $r$ are furrow-closers of usual kind.

When the machine is to be used for planting cotton, the rod $f$ is first disconnected from the slide $l$. The slide $l$ is then withdrawn entirely from the hopper, the bottom $m$ thereupon moved sidewise to bring its aperture $z$ into line with $x$, and is then fastened by suitable set-screws or other means. The rod $f$ is now connected with a slide, $q$, which is arranged in the upper part of the hopper, and from which pendent arms S S extend into the hopper for stirring the seed. A chain or band is next laid around pulleys $c$ and $h$, the pulley $c$ being mounted upon the shaft $d$, and the pulley $h$ upon the agitator-shaft $g$, which is hung in the hopper. The shaft $g$ carries projecting agitator-arms $o$ $o$. During the operation, the slide $q$ will now be reciprocated to stir the adhering seed, and the agitators $o$ $o$ will be rotated to convey said seed into the discharge opening.

I claim as my invention—

The laterally-adjustable bottom $m$, having the apertures $z$ and $y$, and the groove $k$, arranged in a seed-hopper, B, and combined with the slide $l$ and with the stirrer $s$ and agitator $o$, substantially as herein shown and described.

CARLES DOMSCHKE.

Witnesses:
A. GOMERT,
WM. BAUMAN.